(12) United States Patent
Rice et al.

(10) Patent No.: US 12,159,442 B2
(45) Date of Patent: Dec. 3, 2024

(54) SYSTEMS AND METHODS FOR DETECTING IMAGE RECAPTURE

(71) Applicant: TruePic Inc., La Jolla, CA (US)

(72) Inventors: Oliver Rice, Huntsville, AL (US); Justin Mark Stayton, Chattanooga, TN (US); Gordon Charles Hughes, Loveland, OH (US)

(73) Assignee: TruePic Inc., San Diego, CA (US)

( * ) Notice: Subject to any disclaimer, the term of this patent is extended or adjusted under 35 U.S.C. 154(b) by 0 days.

(21) Appl. No.: 18/085,856

(22) Filed: Dec. 21, 2022

(65) Prior Publication Data
US 2023/0117683 A1  Apr. 20, 2023

Related U.S. Application Data

(63) Continuation of application No. 17/346,821, filed on Jun. 14, 2021, now Pat. No. 11,544,835, which is a
(Continued)

(51) Int. Cl.
*G06K 9/00* (2022.01)
*G06T 7/00* (2017.01)
(Continued)

(52) U.S. Cl.
CPC ............ *G06V 10/40* (2022.01); *G06T 7/0002* (2013.01); *G06V 10/7715* (2022.01);
(Continued)

(58) Field of Classification Search
CPC ......... G06T 7/0002; G06T 2207/10016; G06T 2207/10028; G06T 2207/20076;
(Continued)

(56) References Cited

U.S. PATENT DOCUMENTS

| | | |
|---|---|---|
| 5,351,134 A | 9/1994 | Yaguchi |
| 5,499,294 A | 3/1996 | Friedman |

(Continued)

FOREIGN PATENT DOCUMENTS

| | | |
|---|---|---|
| CN | 101258744 A | 9/2008 |
| CN | 102687159 A | 9/2012 |

(Continued)

OTHER PUBLICATIONS

Face spoofing detection from single images using texture and local shape analysis, J. Maatta et al., IETBIometrics, 2012, pp. 3-10 (Year: 2012).*

(Continued)

*Primary Examiner* — Jayesh A Patel
(74) *Attorney, Agent, or Firm* — Sheppard Mullin Richter & Hampton LLP

(57) ABSTRACT

Systems, computer-implemented methods, and non-transitory machine-readable storage media are provided for detecting recapture attacks of images. One method comprises extracting one or more features from an image captured by a device; applying the one or more features as input to a trained machine learning model, wherein the trained machine learning model outputs a first score based on the extracted features; obtaining metadata of the image; performing a statistical analysis of the metadata of the image; generating a second score based on the statistical analysis of the metadata of the image; and generating a probability that the image is a recapture of an original image based on the first score and the second score.

17 Claims, 5 Drawing Sheets

Related U.S. Application Data continuation of application No. 17/146,724, filed on Jan. 12, 2021, now Pat. No. 11,037,284.

(60) Provisional application No. 62/961,063, filed on Jan. 14, 2020.

(51) Int. Cl.
*G06V 10/40* (2022.01)
*G06V 10/77* (2022.01)
*G06V 10/774* (2022.01)

(52) U.S. Cl.
CPC .. *G06V 10/774* (2022.01); *G06T 2207/10016* (2013.01); *G06T 2207/10028* (2013.01); *G06T 2207/20076* (2013.01); *G06T 2207/20081* (2013.01); *G06T 2207/30168* (2013.01); *G06T 2207/30241* (2013.01); *G06V 2201/10* (2022.01)

(58) Field of Classification Search
CPC . G06T 2207/20081; G06T 2207/30168; G06T 2207/30241; G06K 9/46; G06K 9/6232
See application file for complete search history.

(56) References Cited

U.S. PATENT DOCUMENTS

| | | | |
|---|---|---|---|
| 6,342,290 B1 | 1/2002 | Conk | |
| 6,411,725 B1 | 6/2002 | Rhoads | |
| 6,487,301 B1 | 11/2002 | Zhao | |
| 6,557,102 B1 | 4/2003 | Wong | |
| 6,628,417 B1 | 9/2003 | Naito | |
| 6,823,075 B2 | 11/2004 | Perry | |
| 6,947,571 B1 | 9/2005 | Rhoads | |
| 7,209,571 B2* | 4/2007 | Davis | G06F 21/10 705/317 |
| 7,277,576 B2 | 10/2007 | Abbate | |
| 7,525,578 B1 | 4/2009 | Barbeau | |
| 7,616,777 B2 | 11/2009 | Rodriguez | |
| 7,958,458 B2 | 6/2011 | Maeta | |
| 8,121,342 B2 | 2/2012 | Davis | |
| 8,413,882 B1 | 4/2013 | Nidamarthi | |
| 8,443,001 B2 | 5/2013 | Nichols | |
| 8,462,209 B2* | 6/2013 | Sun | H04N 23/45 348/159 |
| 8,849,819 B2 | 9/2014 | Johnson | |
| 8,868,039 B2 | 10/2014 | Rodriguez | |
| 8,879,120 B2 | 11/2014 | Thrasher | |
| 8,955,137 B2 | 2/2015 | Mousty | |
| 9,002,719 B2 | 4/2015 | Tofte | |
| 9,082,235 B2 | 7/2015 | Lau | |
| 9,300,678 B1 | 3/2016 | Stack | |
| 9,594,980 B1 | 3/2017 | Graham | |
| 9,609,288 B1 | 3/2017 | Richman | |
| 9,614,886 B2 | 4/2017 | Zhong | |
| 9,621,565 B2 | 4/2017 | Stack | |
| 9,652,460 B1 | 5/2017 | Barisic | |
| 9,779,775 B2* | 10/2017 | Pacurariu | G06V 20/41 |
| 9,832,017 B2 | 11/2017 | Malone | |
| 9,910,865 B2* | 3/2018 | Mikolajczyk | G06F 16/58 |
| 10,013,568 B2 | 7/2018 | Mityagin | |
| 10,095,877 B2 | 10/2018 | Stack | |
| 10,102,526 B1 | 10/2018 | Madisetti | |
| 10,255,419 B1 | 4/2019 | Kragh | |
| 10,277,400 B1 | 4/2019 | Griffin | |
| 10,360,668 B1 | 7/2019 | McGregor | |
| 10,361,866 B1 | 7/2019 | McGregor | |
| 10,375,050 B2 | 8/2019 | Lyons | |
| 10,389,733 B2 | 8/2019 | Fasoli | |
| 10,404,477 B1 | 9/2019 | Deck | |
| 10,467,507 B1 | 11/2019 | Hao | |
| 10,635,894 B1* | 4/2020 | Genner | G06V 40/16 |
| 10,726,533 B2 | 7/2020 | McGregor | |
| 10,733,315 B2 | 8/2020 | Stack | |
| 11,037,284 B1* | 6/2021 | Rice | G06V 10/774 |
| 11,159,504 B2 | 10/2021 | Lyons | |
| 11,256,792 B2 | 2/2022 | Tussy | |
| 11,334,687 B2 | 5/2022 | Stack | |
| 11,373,449 B1* | 6/2022 | Genner | G06V 40/103 |
| 11,544,835 B2* | 1/2023 | Rice | G06V 10/774 |
| 11,646,902 B2 | 5/2023 | McGregor | |
| 2002/0056043 A1 | 5/2002 | Glass | |
| 2003/0065922 A1 | 4/2003 | Fredlund | |
| 2004/0039912 A1 | 2/2004 | Borrowman | |
| 2004/0091111 A1 | 5/2004 | Levy | |
| 2004/0153649 A1 | 8/2004 | Rhoads | |
| 2004/0213437 A1 | 10/2004 | Howard | |
| 2005/0125668 A1 | 6/2005 | Botz | |
| 2005/0273368 A1 | 12/2005 | Hutten | |
| 2006/0018506 A1 | 1/2006 | Rodriguez | |
| 2006/0036864 A1 | 2/2006 | Parulski | |
| 2006/0115111 A1 | 6/2006 | Malone | |
| 2006/0120562 A1 | 6/2006 | Fudge | |
| 2006/0157559 A1* | 7/2006 | Levy | G06Q 20/40145 235/380 |
| 2006/0218404 A1 | 9/2006 | Ogura | |
| 2006/0262976 A1 | 11/2006 | Hart | |
| 2007/0019836 A1 | 1/2007 | Thorwirth | |
| 2007/0091376 A1 | 4/2007 | Calhoon | |
| 2007/0162756 A1 | 7/2007 | Fredlund | |
| 2007/0171288 A1 | 7/2007 | Inoue | |
| 2008/0005086 A1 | 1/2008 | Moore | |
| 2009/0044235 A1 | 2/2009 | Davidson | |
| 2009/0320101 A1 | 12/2009 | Doyle | |
| 2010/0046748 A1 | 2/2010 | Kusnoto | |
| 2010/0250953 A1 | 9/2010 | Wiersma | |
| 2010/0281475 A1 | 11/2010 | Jain | |
| 2010/0309987 A1* | 12/2010 | Concion | H04N 19/124 375/E7.029 |
| 2010/0317399 A1 | 12/2010 | Rodriguez | |
| 2011/0085728 A1* | 4/2011 | Gao | G06F 18/214 382/165 |
| 2011/0087690 A1 | 4/2011 | Cairns | |
| 2011/0156879 A1 | 6/2011 | Matsushita | |
| 2011/0221568 A1 | 9/2011 | Giobbi | |
| 2011/0231645 A1 | 9/2011 | Thomas | |
| 2011/0258326 A1 | 10/2011 | Hu | |
| 2012/0004949 A1 | 1/2012 | Coleman | |
| 2012/0143630 A1 | 6/2012 | Hertenstein | |
| 2012/0269425 A1* | 10/2012 | Marchesotti | G06V 10/993 382/162 |
| 2012/0278370 A1 | 11/2012 | Nichols | |
| 2012/0311623 A1 | 12/2012 | Davis | |
| 2013/0041948 A1 | 2/2013 | Tseng | |
| 2014/0049653 A1 | 2/2014 | Leonard | |
| 2014/0081932 A1 | 3/2014 | Krislov | |
| 2014/0198687 A1 | 7/2014 | Raleigh | |
| 2014/0244781 A1 | 8/2014 | Klayko | |
| 2014/0279493 A1 | 9/2014 | Kamath | |
| 2014/0297810 A1 | 10/2014 | Zhong | |
| 2014/0324986 A1 | 10/2014 | Zhang | |
| 2014/0358964 A1 | 12/2014 | Woods | |
| 2015/0016661 A1 | 1/2015 | Lord | |
| 2015/0142595 A1 | 5/2015 | Acuna-Rohter | |
| 2015/0154436 A1 | 6/2015 | Shi | |
| 2015/0213324 A1* | 7/2015 | Farid | G06V 20/80 382/218 |
| 2015/0310306 A1 | 10/2015 | Song | |
| 2016/0162729 A1 | 6/2016 | Hagen | |
| 2016/0224768 A1 | 8/2016 | Boccon-Gibod | |
| 2016/0301531 A1 | 10/2016 | Finlow-Bates | |
| 2016/0379330 A1 | 12/2016 | Powers | |
| 2017/0041306 A1 | 2/2017 | Stack | |
| 2017/0041328 A1 | 2/2017 | Stack | |
| 2017/0048216 A1 | 2/2017 | Chow | |
| 2017/0093867 A1 | 3/2017 | Burns | |
| 2017/0118493 A1 | 4/2017 | Hain | |
| 2017/0178058 A1 | 6/2017 | Bhat | |
| 2017/0180277 A1 | 6/2017 | Brady | |
| 2017/0193329 A1* | 7/2017 | Suman | G06F 18/22 |
| 2017/0193594 A1 | 7/2017 | Glasgow | |
| 2017/0295232 A1 | 10/2017 | Curtis | |
| 2017/0359326 A1 | 12/2017 | Garcia | |

(56) References Cited

U.S. PATENT DOCUMENTS

| | | | |
|---|---|---|---|
| 2017/0373847 | A1 | 12/2017 | Chien |
| 2017/0373859 | A1 | 12/2017 | Shors |
| 2017/0374622 | A1 | 12/2017 | Juhani |
| 2018/0019873 | A1 | 1/2018 | Kraemer |
| 2018/0026932 | A1 | 1/2018 | Wang |
| 2018/0048474 | A1 | 2/2018 | Landrock |
| 2018/0260888 | A1 | 9/2018 | Paolini-Subramanya |
| 2018/0357501 | A1* | 12/2018 | Ma .................... G06V 40/164 |
| 2018/0365442 | A1 | 12/2018 | Stack |
| 2019/0042722 | A1 | 2/2019 | Hansen |
| 2019/0095655 | A1 | 3/2019 | Krawczewicz |
| 2019/0109834 | A1* | 4/2019 | Lyons ................ H04L 9/3242 |
| 2019/0109981 | A1* | 4/2019 | Zhang ................ H04N 23/64 |
| 2019/0147305 | A1 | 5/2019 | Lu |
| 2019/0164285 | A1 | 5/2019 | Nye |
| 2019/0251349 | A1 | 8/2019 | Duerksen |
| 2019/0281259 | A1 | 9/2019 | Palazzolo |
| 2019/0391972 | A1 | 12/2019 | Bates |
| 2020/0007331 | A1 | 1/2020 | Wentz |
| 2020/0012806 | A1 | 1/2020 | Bates |
| 2020/0126209 | A1 | 4/2020 | Kim |
| 2020/0210768 | A1 | 7/2020 | Turkelson |
| 2021/0004949 | A1 | 1/2021 | Broyda |
| 2021/0377262 | A1 | 12/2021 | Butler |
| 2022/0179998 | A1 | 6/2022 | Lamplmair |

FOREIGN PATENT DOCUMENTS

| | | | |
|---|---|---|---|
| CN | 104079830 | A | 10/2014 |
| CN | 103345758 | B | 8/2016 |
| EP | 3099058 | A1 * | 11/2016 |
| JP | 2012164064 | | 8/2012 |
| WO | 9909743 | | 2/1999 |
| WO | 0152178 | | 7/2001 |
| WO | 0227431 | A2 | 4/2002 |
| WO | 2015020601 | A1 | 2/2015 |
| WO | 2017023896 | | 2/2017 |

OTHER PUBLICATIONS

An Overview on Image Forensics, Alessandro Piva, Hindawi, 2012, pp. 1-23 (Year: 2012).*

A Face Antispoofing Database with Diverse Attacks, Zhiwei Zhang et al., IEEE, 2012, pp. 26-31 (Year: 2012).*

On the Effectiveness of Local Binary Patterns in Face Antispoofing, Ivana Chingovska et al., Biosig, 2012, pp. 1-7 (Year: 2012).*

Secure Face Unlock: Spoof Detection on Smartphones, Keyurkumar Patel et al., IEEE, 2016, pp. 2268-2283 (Year: 2016).*

Face Liveness Detection Under Bad Illumination Conditions, Bruno Peixoto et al., Unicamp, 2011, pp. 3557-3560 (Year: 2011).*

Image Recapture Detection with Convolutional and Recurrent Neural Networks, Haoliang Li et al., SIST, 2017, pp. 87-91 (Year: 2017).*

Recapture detection technique based on edge-types by analysing high-frequency componentsin digital images acquired through LCD screens, Areesha Anjum et al., Springer, 2020, pp. 6965-6985 (Year: 2020).*

Detection of second-generation images using an assessment criteria method, Glenn Porter et al., JOCRPP, 2015, pp. 207-222 (Year: 2015).*

An Image Recapture Detection Algorithm Based on Learning Dictionaries of Edge Profiles, Thirapiroon Thongkamwitoon et al., IEEE, 2015, pp. 953-968 (Year: 2015).*

A simple and effective image-statistics-based approach to detecting recaptured images from LCD screens, Kai Wang, Elsevier, 2017, pp. 75-87 (Year: 2017).*

Wild Cetacea Identification using Image Metadata, JCS&T, 2017, pp. 79-84 (Year: 2017).*

Recaptured Image Detection Based on DCT Coefficients, JOCIS, 2013, pp. 8139-8145 (Year: 2013).*

Bhowmik, Deepayan et al., "The Multimedia Blockchain: A Distributed and Tamper-Proof Media Transaction Framework", Digital Signal Processing (DSP), 2017 22nd International Conference on IEEE, 2017, 6 pages (Year: 2017).

Cao, Hong, et al., "Identification of Recaptured Photographs on LCD Screens", IEEE, 978-1-4244-4296-6, 2010, (Year: 2010), pp. 1790-1793.

Chinese Patent Application No. 201680057888.X, Office Action mailed Aug. 5, 2020, 9 pages.

De Las Heras, Lluis-Pere, et al., Use Case Visual Bag-of-Words Techniques for Camera Based Identity Document Classification, 2015 13th International Conference on Document Analysis and Recognition (ICDAR), IEEE, 978-1-4799-1805-8/15, 2015, (Year: 2015), pp. 721-725.

Drescher, Daniel, "Blockchain Basics: A Non-Technical Introduction in 25 Steps", 255 pages, APress, ISBN 978-1-4842-2603-2, 2017, 246 pages (Year: 2017).

European Patent Application No. 16833714.5, Supplementary European Search Report, mailed Nov. 13, 2018, 7 pages.

International Patent Application No. PCT/US2016/045089, an International Search Report and Written Opinion issued by Authorized Officer Lee W. Young, mailed Oct. 21, 2016, 8 pages.

International Patent Application No. PCT/US2018/053059, an International Search Report and Written Opinion issued by Authorized Officer Lee W. Young, mailed Dec. 10, 2018, 13 pages.

International Patent Application No. PCT/US2019/045245, an International Search Report and Written Opinion issued by Authorized Officer Harry C. Kim, mailed Feb. 11, 2020, 14 pages.

Ke, Yongzhen, et al., "Image Recapture Detection Using Multiple Features", International Journal of Multimedia and Ubiquitous Engineering, vol. 8, No. 5, ISSN: 1975-0080 IJMUE, 2013 (Year: 2013 ), pp. 71-82.

NG, Tian-Tsong, et al., "Discrimination of Computer Synthesized or Recaptured Images from Real Images", Springer, : 10.1007/978-1-4614-0757-7 _ 10, 2013, (Year: 2013), pp. 275-309.

The TCP/IP Guide, tcpipguide.com, 2005, pp. 1-4.

Thongkamwitoon, Thirapiroon, et al., "An Image Recapture Detection Algorithm Based on Learning Dictionaries of Edge Profiles", IEEE Transactions on Information Forensics and Security, vol. 10, No. 5, May 2015, 10.1109/TIFS.2015.2392566, 2015, (Year: 2015), pp. 953-968.

Wang, Kai, "A Simple and Effective Image-Statistics-Based Approach to Detecting Recaptured Images from LCD Screens", Digital Investigation, vol. 23, Elsevier, 1742-2876, 2017, (Year: 2017), pp. 75-87.

* cited by examiner

SYSTEMS AND METHODS FOR DETECTING IMAGE RECAPTURE

CROSS-REFERENCE TO RELATED APPLICATIONS

This application is a continuation of U.S. patent application Ser. No. 17/346,821, filed Jun. 14, 2021, entitled "SYSTEMS AND METHODS FOR DETECTING IMAGE RECAPTURE", which is a continuation of U.S. patent application Ser. No. 17/146,724, filed Jan. 12, 2021, entitled "SYSTEMS AND METHODS FOR DETECTING IMAGE RECAPTURE" (which issued as U.S. Pat. No. 11,037,284 on Jun. 15, 2021), which claims the benefit under 35 U.S.C. § 119(e) of U.S. Provisional Patent Application Ser. No. 62/961,063, filed Jan. 14, 2020, which are hereby incorporated by reference in their entirety.

FIELD OF THE INVENTION

The present disclosure relates to technologies for detecting recapture attacks of images, including picture of a picture (POP) and video of a video (VOV) attacks.

BACKGROUND OF THE INVENTION

The use of digital images (including still pictures, video, multimedia, and/or other images) has grown steadily since its introduction. Social networks and mobile computing devices have further accelerated the growth of digital images. The ability to create and share digital images anytime and anywhere has resulted in the general public consuming more image data than ever and relying on these images for up to the minute information. However, it is a well-known fact that digital images are easily edited, and the information contained within a digital image may not be entirely trustworthy. Thus, obtaining trustworthy evidence based on digital images can be challenging due to the use of technology that can alter and compromise the integrity of such images. These and other problems exist with the use of digital images, in general, and more specifically in connection with image collection and authentication systems.

Authenticated images can be used in many situations, particularly where the image is used as evidence or proof of some fact or set of facts. For example, various industries deal with technical challenges around remote or virtual underwriting and inspections. Traditionally an inspection required a trusted human inspector to go view a property, business, or asset in person. This is costly and time consuming. The use of technology has enabled remote or virtual inspections. However, this technical solution has led to other issues.

One issue with using digital images to facilitate a remote or virtual inspection is that verifying that an image is an authentic original image and not a recapture of the original image can be difficult. For example, in the context of insurance claims, a photo of damage to a vehicle may be substituted for an in-person physical inspection. However, a high-quality photo of a computer screen on which a picture of a damaged vehicle is displayed (which may also be referred to as a "picture of a picture" or "POP") may be indistinguishable to the human eye from the original photo of the damaged vehicle itself. In the same context, a video of the car accident that caused the damage may serve as a substitute for an in-person physical inspection. However, a high-quality video recording of a computer screen on which the original video of the car accident is being played back (which may also be referred to as a "video of a video" or "VOV") may be indistinguishable to the human eye from the initial video capture of the car accident itself. In order to rely on an image as a substitute for an in-person physical inspection, the insurance provider must be able to verify that images provided are not a POP or a VOV.

This problem exists across many industries and in many contexts where an electronically provided image is relied on for what is depicted in that image.

SUMMARY OF THE INVENTION

Various embodiments of the present disclosure include systems and methods for determining if an image is an original image or a recapture (referred to herein collectively as a "recapture") of the original image. In part, the invention provides technical solutions to address the technical problems that arise due to the use of various technologies that can be used to recapture digital images. The systems and methods include various techniques that may be utilized alone or in various combinations. These techniques may use an image's visual content as well as metadata associated with the image.

The system may comprise a computer platform that includes an authentication server. The authentication server may include one or more physical processors, one or more electronic storage devices, and/or other components. The one or more processors may be configured by computer-readable instructions. The one or more computer-readable instructions may comprise at least a recapture detection application configured to determine a likelihood that an image comprises a recapture of an original image. The recapture detection application may include a content analysis component, a metadata analysis component, a recapture model component, a model training component, and/or other computer program components.

The content analysis component may be configured to analyze visual content included within an image. In various implementations, content analysis component may be configured to extract features from the image. For example, content analysis component may be configured to extract features from the image that indicate that a surface being captured or recorded is flat or two-dimensional. In some implementations, content analysis component may be configured to perform a discrete cosine transform (DCT) of the image in order to extract features that are likely to expose the signs of a recapture. In various implementations, content analysis component may be configured to perform simultaneous localization and mapping (SLAM) on an image to be authenticated. For example, video frames (or still images within a video) displaying the same scene from multiple angles enables triangulation of scene points in three-dimensional space into a scene depth map. The relative movement of those points in successive frames can be used to estimate the capture device's trajectory through space. In various implementations, content analysis component may be configured to extract features from the depth map that are likely to expose the signs of a rebroadcast.

The metadata analysis component may be configured to analyze metadata associated with an image. For example, the metadata analysis component may be configured to perform a statistical analysis of values from the metadata. In various implementations, the metadata analysis component may be configured to compare values from the metadata to historical distributions (or historical datasets) for known POPs and VOVs and camera originals. The metadata may include various types of data, including, for example, sensor data generated by one or more sensors associated with the image capture device used to capture the image and/or other metadata that may be available. The metadata analysis component may be configured to compare various forms of sensor data to determine whether they are consistent. For example, when the sensor measurements fail to align, it may suggest that the image has been manipulated or comprises a recapture. In some implementations, the metadata analysis component may be configured to use the sensor data to estimate the trajectory of the image capture device when capturing the image. This trajectory estimation may be compared to a separate trajectory estimation based on SLAM. The similarity of the two trajectories may be used to determine if the visual information received by the image capture device is a camera original scene.

The recapture model component may be configured to generate a score indicating a predicted probability that an image is a recapture of an original image. For example, scores generated for the extracted features, the metadata analysis, and/or the device trajectory generated based on the comparison of the two independent device trajectory estimates may be inputted into one or more models (described below) to calculate a probability that the image comprises a recapture of an original image. The system may output an indication of whether the image is an original or a rebroadcast/recapture. Various other techniques can be used including those described in more detail below.

The model training component may be configured to train the models described herein. For example, the model training component may be configured to train a machine learning model used to generate and output a score based on extracted features, an image meta model configured to output a probability that a photo is a recapture of an original image (i.e., a POP), a video meta model configured to output a probability that a video is a recapture (i.e., a VOV), and/or other models utilized by the recapture detection application. In various implementations, the model training component may be configured to utilize supervised and/or unsupervised learning techniques to train the models described herein.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

The drawings are provided for purposes of illustration only and merely depict typical or example implementations. These drawings are provided to facilitate the reader's understanding and shall not be considered limiting of the breadth, scope, or applicability of the disclosure. For clarity and ease of illustration, these drawings are not necessarily drawn to scale.

DETAILED DESCRIPTION OF THE INVENTION

It will be appreciated by those having skill in the art that the implementations described herein may be practiced without these specific details or with an equivalent arrangement. In various instances, well-known structures and devices are shown in block diagram form to avoid unnecessarily obscuring the implementations.

Example System Architecture

Figure 1:
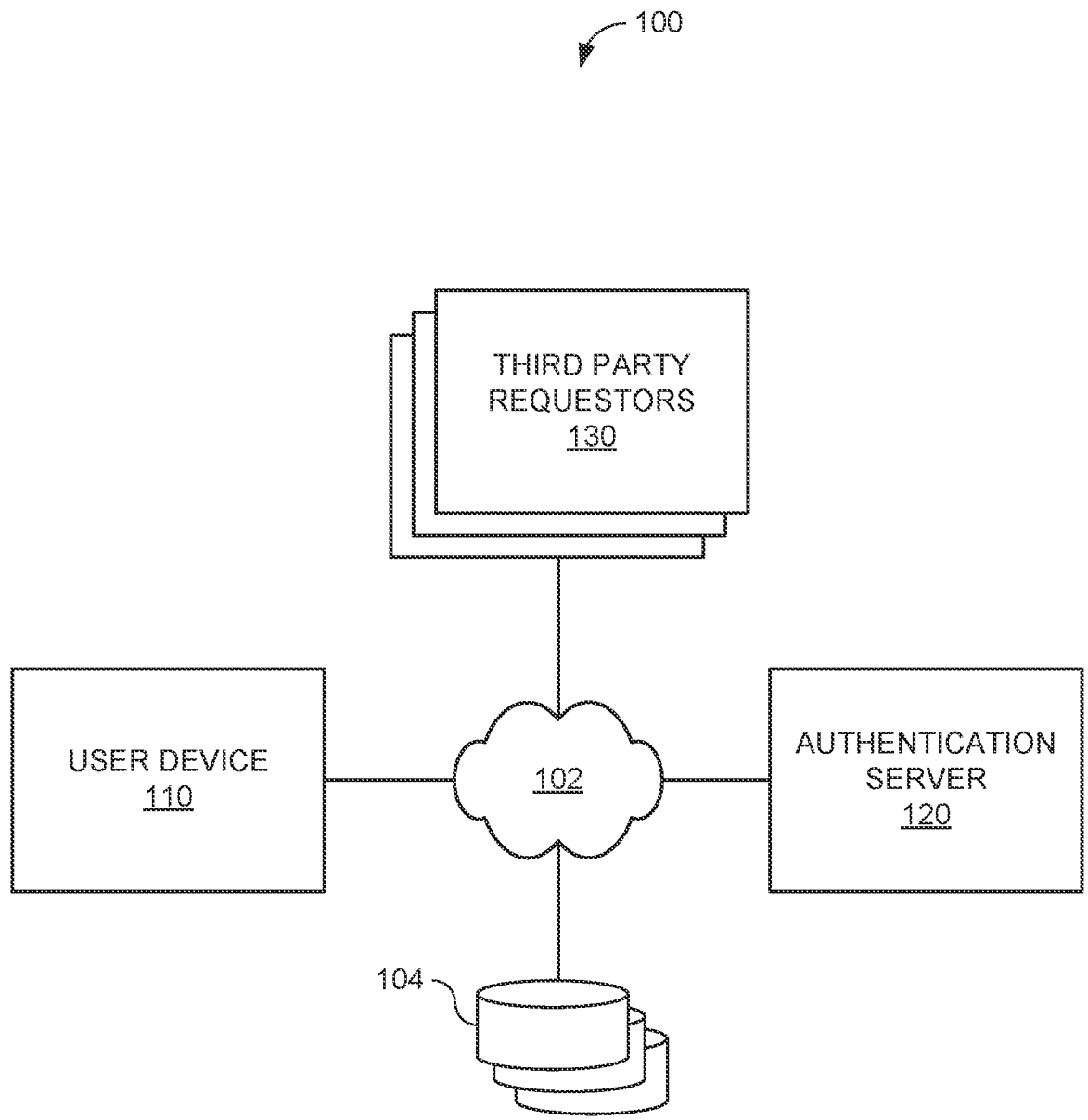
FIG. 1 illustrates an example of a system for capturing an image at a device to be authenticated in conjunction with an authentication server accessible to the device via a network communication, according to an implementation of the invention.

FIG. 1 illustrates a system for capturing an image at a device to be authenticated in conjunction with an authentication server accessible to the device via a network communication, according to an implementation of the invention. In various implementations, system 100 may include a user device 110, an authentication server 120, third party requesters 130, a database 140, and/or other components. The components of system 110 may be in communication with one another via a network 102.

In some implementations, a software application residing on user device 110 (e.g., a smart phone or other client device) may be configured to control various aspects of image capture on the client device where authentication of image(s) is desired. For example, the software application residing on user device 110 may comprise an image authentication application as described in U.S. patent application Ser. No. 14/816,712, entitled "SYSTEMS AND METHODS FOR AUTHENTICATING PHOTOGRAPHIC IMAGE DATA," filed Aug. 3, 2015 (and issued as U.S. Pat. No. 9,300,678 on Mar. 29, 2016), the disclosure of which is hereby incorporated by reference in its entirety herein.

In some implementations, authentication server 120 may be configured to receive a digital image and associated data via the image authentication application, create an authenticated image, and/or provide a website for storing the authenticated images, thereby enabling users who subsequently receive a copy of the image to determine if it is an authentic image. Collectively, the image authentication application and authentication server may be configured to be operable to control the capture of digital images to be authenticated and the association of metadata with those images. In some implementations, the image authentication application may require users, desiring to generate an authenticated image, to invoke the image authentication application to capture the image. The image authentication application and authentication server include functionality to reduce the likelihood of alteration of metadata associated with a picture taken under control of the application.

Once a picture or video is captured under control of the image authentication application, the image authentication application is configured to send the picture of video to the authentication server. The image authentication application may prevent a digital image that has been taken from being edited or sent from the image authentication application to any location other than the authentication server. This helps prevent alteration of the digital image. To capture a digital image, the user may be required to open the image authentication application (if it is not already open on the device). After capturing the image(s) using the image authentication application and selecting to use the image(s), the image(s) will be transmitted to the authentication server along with metadata associated with the image(s).

Figure 2:
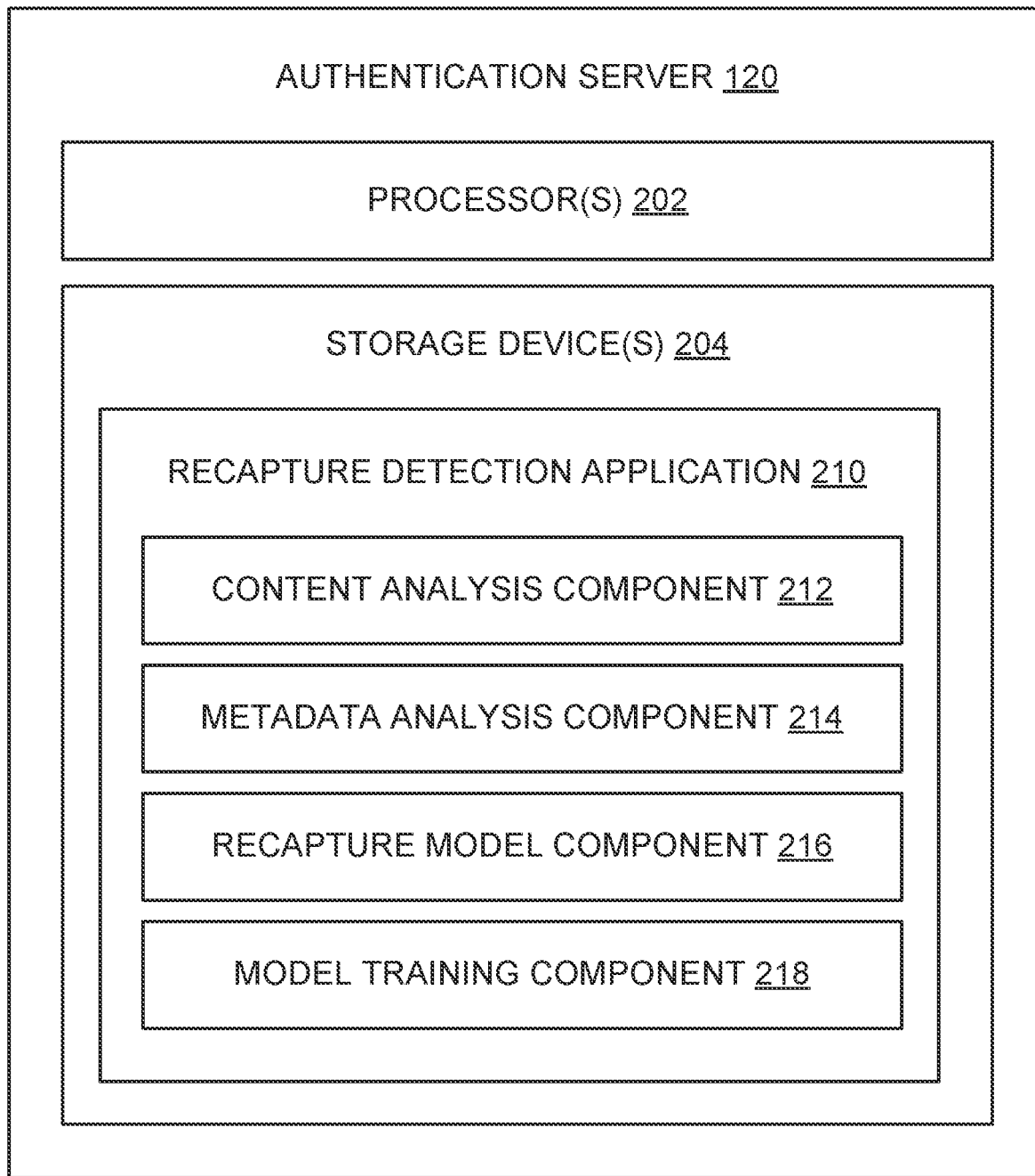
FIG. 2 illustrates an example of an authentication server configured to distinguish an original image from an image that comprises a recapture of the original image, in accordance with one or more implementations of the invention.

FIG. 2 illustrates an example of an authentication server 120 configured to distinguish an original image from an image that comprises a recapture of the original image, in accordance with one or more implementations. In various implementations, authentication server 120 may include one or more physical processors 202, one or more electronic storage devices 204, and/or other components. The one or more physical processors 202 (also interchangeably referred to herein as processor(s) 202, processor 202, or processors 202 for convenience) may be configured to provide information processing capabilities in authentication server 120. As such, the processor(s) 202 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. Processor(s) 202 may be programmed by one or more computer program instructions (such as those stored in one or more electronic storage devices 204). For example, processor(s) 202 may be programmed by recapture detection application 210 and/or other instructions that program authentication server 120 to perform various operations, each of which are described in greater detail herein.

Recapture detection application 210 may be configured to determine a likelihood that an image comprises a recapture of an original image. In other words, recapture detection application 210 may be configured to determine a likelihood that an image comprises a POP or a VOV. As referred to herein, an "image" may comprise a still image, a series of images, a video, and/or other visual media content captured by an image capture device. For example, an "image" may comprise a digital image captured by an image capture device of user device 110. In various implementations, recapture detection application 210 may be configured to determine a likelihood that an image captured via an image authentication application and received by authentication server 120 via user device 110 comprises a recapture of an original image based on the visual content of the image and/or the metadata associated with the image. In some implementations, the metadata associated with the image may include sensor data generated by one or more sensors associated with the image capture device used to capture the image. For example, the metadata may include sensor data generated by one or more sensors of a user device (i.e., user device 110) that comprises the image capture device used to capture the image.

A primary quality of recaptures is that the surface being recorded is flat or two-dimensional. This assumption is made because digital mediums for displaying low-distortion visual streams tend to be flat. For that reason, detecting if the scene captured by a picture or video contains depth is a strong signal in evaluating whether the image comprises a recapture. Recaptures may also be characterized by distortion artifacts specific to the medium used to display them. For example, a printed picture may have a color profile that tends to be different from camera originals. In some implementations, a picture displayed on a screen could have visible pixels or show signs of aliasing. Recapture detection application 210 may be configured to determine a likelihood that an image comprises a recapture of an original image based on these characteristics of recaptured images.

Given that a video is a sequence of images, the verification techniques applied for photo can be applied to video to produce a sequence of POP probabilities. Additionally, sensor data included within the metadata associated with the image may be utilized to estimate a trajectory of the device capturing the image. In various implementations, recapture detection application 210 may be configured to utilize the estimated trajectory of the device to calculate a probability that the image comprises a recapture of an original image.

In various implementations, recapture detection application 210 may comprise computer-readable instructions executable by processor(s) 202. The components of recapture detection application 210 may comprise content analysis component 212, metadata analysis component 214, recapture model component 216, model training component 218, and/or other computer program components. As used herein, for convenience, the various components of recapture detection application 210 will be described as performing an operation, when, in fact, the various components comprise instructions which may program the processor(s) 202 (and therefore authentication server 120) to perform the operation.

Content analysis component 212 may be configured to analyze visual content included within an image. In various implementations, content analysis component 212 may be configured to extract features that are likely to expose the signs of a recapture. For example, content analysis component 212 may be configured to extract features that indicate that a surface being captured or recorded is flat or two-dimensional. In various implementations, extracting features may include detecting pixel color profiles and edges, detecting muted color distributions, detecting aliasing, detecting Moiré pattern (i.e., the visual effect created when recording a screen made up on individual pixels, and/or detecting other visual artifacts.

In various implementations, content analysis component 212 may be configured to transform an image received by authentication server 120 to extract features that are likely to expose the signs of a recapture. For image data transformations, it is convenient to represent images as a three-dimensional tensor of pixels. However, this representation does not readily expose all of the characteristics of images that a machine learning model can leverage. Feature extraction is the process of converting the image tensor into other representations. For example, to transform the image, content analysis component 212 may be configured to perform a discrete cosine transform (DCT) of the image in order to extract features that are likely to expose the signs of a recapture.

In various implementations, features extracted based on the analysis performed by content analysis component 212 on the visual content may be provided as input to a machine learning model to generate a score based on the extracted features. In various implementations, the machine learning model may comprise a convolutional neural network with proprietary architecture. The score generated based on the extracted features may be provided as input to an image meta model to calculate a probability that an image comprises a recapture of an original image, as described further herein with respect to recapture model component 216.

In various implementations, content analysis component 212 may be configured to perform simultaneous localization and mapping on an image to be authenticated. For example, video frames (or still images within a video) displaying the same scene from multiple angles enables triangulation of scene points in three-dimensional space into a scene depth map. The relative movement of those points in successive frames can be used to estimate the capture device's trajectory through space. This process is called simultaneous localization and mapping (or SLAM). In various implementations, content analysis component 212 may be configured to utilize SLAM to generate a depth map. In various implementations, content analysis component 212 may be configured to extract features from the depth map that are likely to expose the signs of a rebroadcast. For example, the total volume contained within known points in the depth map may be determined. The features may comprise numerical features that conveniently expose relevant information to a model. In various implementations, content analysis component 212 may be configured to utilize the relative movement of points in successive frames determined using SLAM to estimate the trajectory of the image capture device used to capture the image in space.

Metadata analysis component 214 may be configured to analyze metadata associated with the image. For example, metadata analysis component 214 may be configured to perform a statistical analysis of values from the metadata. In various implementations, metadata analysis component 214 may be configured to compare values from metadata associated with an image against historical distributions (or historical datasets) for known POPs and VOVs and camera originals. For example, metadata analysis component 214 may be configured to determine, based on the statistical analysis of the values from the metadata, whether the image capture device's focal distance aligns with visual content of the image (e.g., 6 inches of focal distance for a macro landscape scene indicates recapture), whether the image capture device's known camera intrinsic and distortion coefficients accurately "undistort" the image, whether the image capture device's position and orientation sensors imply that the device is pointing in a direction consistent with the visual content (e.g., if camera is pointed down, image is not expected to be the front door of a house), whether three-dimensional geometry implied through visual perception indicates that a captured scene is two-dimensional, and/or other potential indicators that the image comprises a recapture based on values available in the metadata associated with the image.

In various implementations, metadata analysis component 214 may be configured to generate a score for the image based on the analysis of the metadata associated with the image. The score generated for the image based on the analysis of the metadata may be provided as input to a machine learning model to generate a score indicating a likelihood that an image comprises a recapture of an original image, as described further herein with respect to recapture model component 216.

In various implementations, metadata associated with an image may include sensor data. For example, the image capture device used to capture the image may be associated with one or more sensors. The one or more sensors may include one or more of an accelerometer, a GPS device, a gyroscope, a magnetometer, a pedometer, a barometer, a microphone, a speaker, and/or one or more other sensors. In some implementations, the one or more sensors may comprise sensors of a user device (i.e., user device 110) that includes the image capture device and is used to capture an image (e.g., via an image authentication application). In various implementations, the one or more sensors may generate one or more sensor measurements that are included within the metadata associated with the image that is provided with the image to authentication server 120. For example, the sensor measurements may include the relative movement of the image capture device determined by an accelerometer, global coordinates for the image capture device determined by a GPS device, the relative orientation of the image capture device determined by a gyroscope, the global orientation of the image capture device determined by a magnometer, and/or one or more other sensor measurements.

When the sensor measurements fail to align, it suggests that the image has been manipulated or comprises a recapture. For example, consider a camera pointed at a computer monitor displaying a digital image of a person snowboarding downhill on a steep mountain. The visual information would suggest that the camera is moving rapidly forward and downhill. In contrast, the accelerometer and barometer data would not show background levels of camera movement and atmospheric pressure changes expected.

In various implementations, metadata analysis component 214 may be configured to reconstruct an image capture device's trajectory when capturing an image based on the sensor measurements (i.e., the sensor measurements generated by the one or more sensors associated with the image capture device). Notably, recapture detection application 210 may be configured to generate two independent device trajectory estimates—one estimated based on SLAM and one estimated based on sensor data derived from one or more sensors associated with the image capture device. In various implementations, recapture detection application 210 may be configured to measure the similarity between the device trajectory estimated based on SLAM and the device trajectory estimated based on sensor data included within the metadata associated with the image. While SLAM may be deceived, the trajectory estimate based on sensor data is not impacted by recapture. The similarity of the two trajectories may be used to determine if the visual information received by the image capture device is a camera original scene. For example, when recording a VOV, the trajectories inferred from visual data are different from the estimate based on sensor data. In contrast, when recording a camera original scene, the trajectory estimates align. In various implementations, recapture detection application 210 may be configured to generate a score for the device trajectory based on the comparison of the two independent device trajectory estimates.

In some implementations, metadata analysis component 214 may be configured to blacklist an image if the metadata indicates that the image has likely been manipulated or is a POP or VOV. For example, metadata analysis component 214 may be configured to compare the metadata associated with the image against "fingerprints" of known manipulative software (or information within the metadata indicating that the image was derived from or has been manipulated by known manipulative software). If the comparison indicates that the image was likely derived from or has been manipulated by known manipulative software, metadata analysis component 214 may be configured to flag the image. In some implementations, metadata analysis component 214 may similarly be configured to blacklist an image if the trajectory estimated based on sensor data indicates that the image has been manipulated or is not an original image. For example, metadata analysis component 214 may be configured to flag the image has having been manipulated or as not an original image based on the trajectory estimated based on sensor data.

In various implementations, metadata analysis component 214 may be configured to determine whether an image comprises a recapture of an original image based on ultrasonic or near ultrasonic tones. The primary mechanism for a recapture attack involves bringing the image capture device in close proximity to a flat or near-flat display surface. The dispersion pattern of sound waves emanating from a speaker will change depending on the proximity of the speaker to physical objects of various shapes and sizes. As such, metadata analysis component 214 may be configured to determine whether an image comprises a recapture of an original image by determining whether the image capture device is in close proximity to a flat or near-flat display surface based on sensor measurements generated by one or more speakers and one or more microphones associated with the image capture device (i.e., a user device that includes a camera). For example, when capturing an image using the image capture device (e.g., via an image authentication application), the image capture device may be configured to emit tones from one or more speakers and use the image capture device's microphones to sense them in real time. In some implementations, the tones emitted from the one or more speakers may comprise ultrasonic or near ultrasonic tones that are inaudible to the user. The way that the received tones differ from the emitted tones (e.g., frequency or phase shift) may indicate a nearby flat surface. Accordingly, metadata analysis component 214 may be configured to compare sensor measurements generated by a microphone associated with the image capture device to the tones emitted by one or more speakers associated with the image capture device. Based on the comparison, metadata analysis component 214 may be configured to determine whether the image capture device is in close proximity to a flat or near-flat display surface, and thus whether the image comprises a recapture of an original image.

Recapture model component 216 may be configured to input information into one or more models to generate and output a score indicating a predicted probability that the image is a recapture of an original image. For example, for an image comprising a photo, recapture model component 216 may be configured to input a score generated and output by a machine learning model based on the features extracted from the image and/or the score generated for the image based on the analysis of the metadata into an image meta model. The image meta model may comprise a proprietary model that maps from the machine learning model's output and the results of the metadata statistical analysis to a probability that the image is a recapture of an original image (i.e., a POP). In various implementations, the image meta model may be configured to calculate (and output) a predicted probability that the image is a recapture of an original image. Accordingly, recapture model component 216 may be configured to generate a predicted probability that the image is a recapture of an original image.

For an image comprising a video, the same techniques processing operations described above with respect to a photo may be used, in addition or as an alternative to one or more other techniques. For example, recapture model component 216 may be configured to input the score generated based on the analysis of the metadata associated with the image, the features extracted from the depth map that are likely to expose the signs of a rebroadcast, and/or the score for the device trajectory generated based on the comparison of the two independent device trajectory estimates into a video meta model. The video meta model may comprise a proprietary model configured to consume a video's depth features, image capture device trajectory estimate similarity, and sequence of POP probability scores, and return the probability that the video is a recapture (i.e., a VOV). In various implementations, the video meta model may be configured to calculate (and output) a predicted probability that the image is a recapture of an original image. Accordingly, recapture model component 216 may be configured to generate a predicted probability that the image is a recapture of an original image.

Model training component 218 may be configured to train the models described herein. For example, model training component 218 may be configured to train the machine learning model used to generate and output a score based on extracted features, the image meta model configured to output a probability that a phone is a recapture of an original image (i.e., a POP), the video meta model configured to output a probability that a video is a recapture (i.e., a VOV), and/or one or more other models utilized by recapture detection application 210. In various implementations, model training component 218 may be configured to utilize supervised and/or unsupervised learning techniques to train the models described herein.

The various instructions described herein may be stored in one or more electronic storage devices 204, which may comprise random access memory (RAM), read only memory (ROM), and/or other memory. Electronic storage device(s) 204 may comprise non-transitory storage media that electronically stores information. The electronic storage media of electronic storage device(s) 204 may be provided integrally (i.e., substantially non-removable) with authentication server 120 and/or removable storage that is connectable to one or more components of s authentication server 120 via, for example, a port (e.g., a USB port, a Firewire port, etc.) or a drive (e.g., a disk drive, etc.). Electronic storage device(s) 204 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. Electronic storage device(s) 204 may include one or more virtual storage resources (e.g., cloud storage, a virtual private network, and/or other virtual storage resources). Although electronic storage device(s) 204 are shown in FIG. 2 as a single entity, this is for illustrative purposes only. In some implementations, Electronic storage device(s) 204 may comprise multiple storage units. These storage units may be physically located within the same device, or electronic storage device(s) 204 may represent storage functionality of multiple devices operating in coordination.

Electronic storage device(s) 204 may store software algorithms, information determined by processor(s) 202, information received from user device 110, information received from one or more third party requesters 130, information received from one or more external resources, and/or other information that enables authentication server 120 to function as described herein.

Example Flowchart of Processes

Figure 3A:
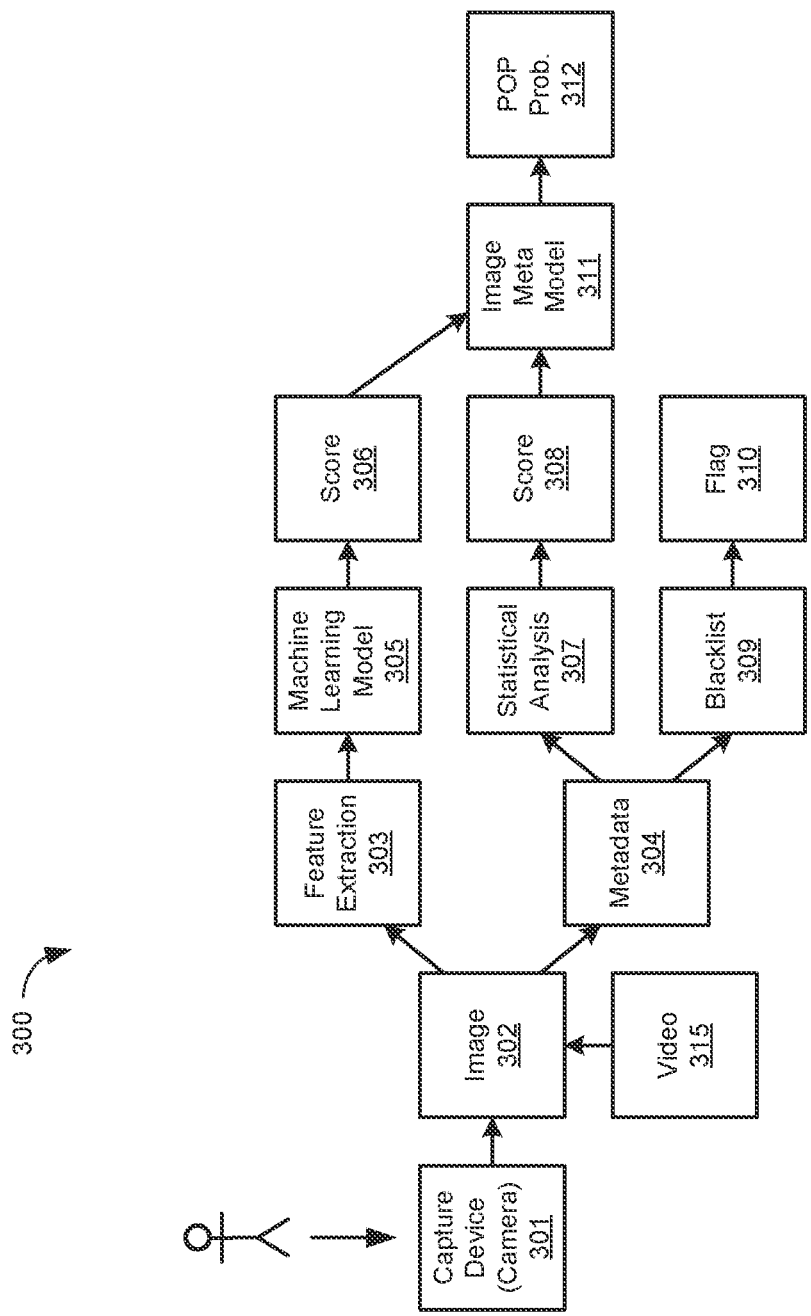
FIGS. 3A, 3B, and 3C illustrate an example of a process of distinguishing an original image from an image that comprises a recapture of the original image, in accordance with one or more implementations of the invention.
Figure 3B:
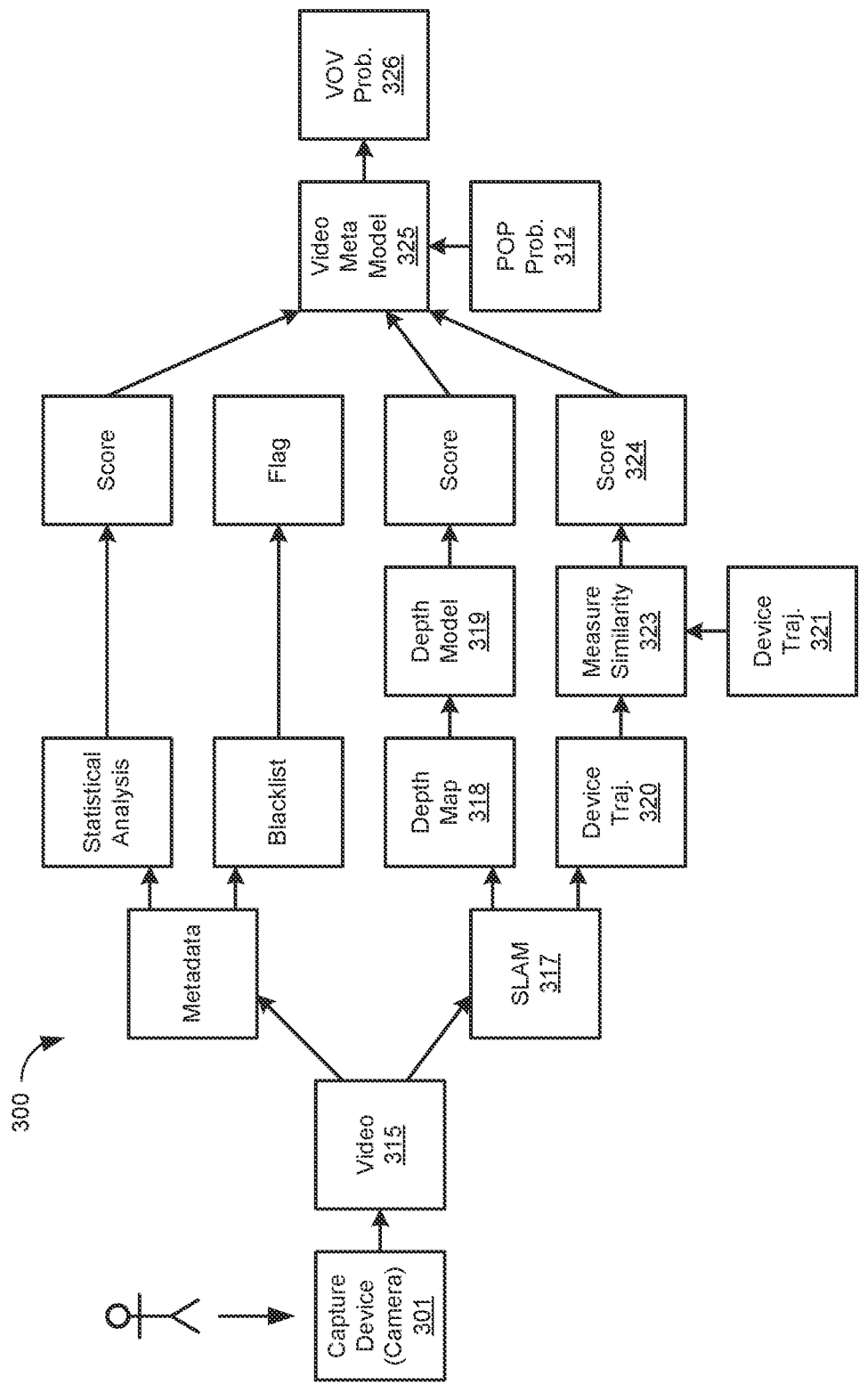
Figure 3C:
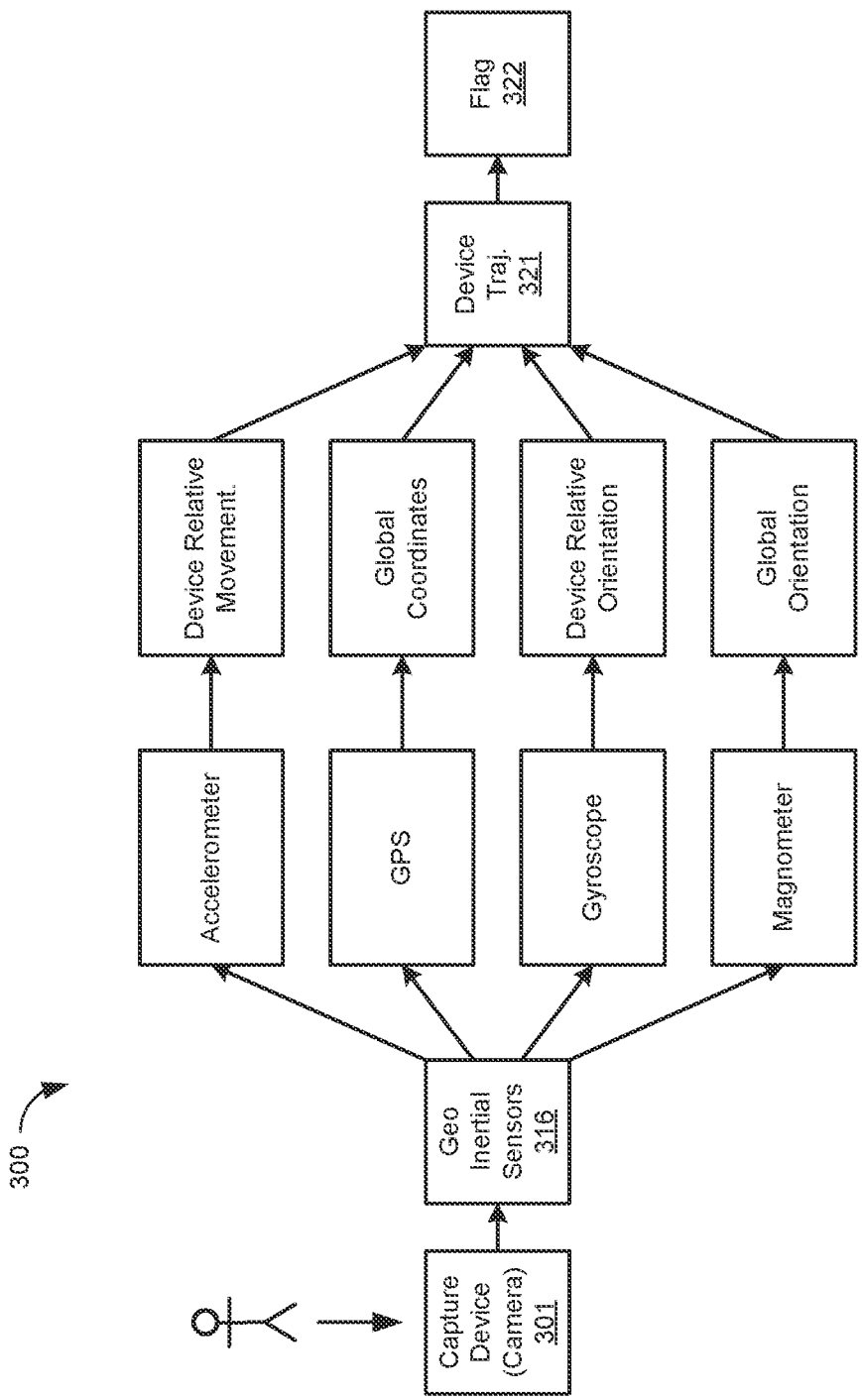

FIGS. 3A, 3B, and 3C illustrate an example of a process 300 of distinguishing an original image from an image that comprises a recapture of the original image, in accordance with one or more implementations. The operations of process 300 presented below are intended to be illustrative and, as such, should not be viewed as limiting. In some implementations, process 300 may be accomplished with one or more additional operations not described, and/or without one or more of the operations discussed. In some implementations, two or more of the operations may occur substantially simultaneously. The described operations may be accomplished using some or all of the system components described in detail above.

In some implementations, process 300 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operations of process 300 in response to instructions stored electronically on one or more electronic storage mediums. The one or more processing devices may include one or more devices configured through hardware, firmware, and/or software to be specifically designed for execution of one or more of the operations of process 300.

In an operation 301, process 300 may include an image capture device (e.g., of a user device) capturing an image to be authenticated. For example, the image may be captured via an image authentication application residing on user device 110 and configured to control image capture on user device 110 via an image capture device of user device 110. The image may comprise a still image, a series of images, a video, and/or other visual media content captured by an image capture device. In various implementations, authentication server 120 may be configured to determine whether the image comprises a photo or a video. In an operation 302, authentication server 120 may be configured to receive an image and determine that the image comprises a photo. As described herein, recapture detection application 210 may be configured to determine a likelihood that an image captured via an image authentication application and received by authentication server 120 via user device 110 comprises a recapture of an original image based on the visual content of the image (i.e., operation 303) and/or the metadata associated with the image (i.e., operation 304).

In an operation 303, process 300 may include analyzing visual content included within the image to extract features that are likely to expose the signs of a recapture. In some implementations, operation 303 may be performed by one or more processor components the same as or similar to content analysis component 212 (shown in FIG. 2 and described herein). In various implementations, recapture detection application 210 may be configured to transform the image. For example, operation 303 may comprise performing a discrete cosine transform (DCT) of the image in order to extract features that are likely to expose the signs of a recapture. In an operation 305, features extracted from the image may be input into a machine learning model. In various implementations, the machine learning model may comprise a convolutional neural network with proprietary architecture. In an operation 306, the machine learning model may be configured to generate and output a score based on the extracted features. In some implementations, operations 305 and 306 may be performed by one or more processor components the same as or similar to content analysis component 212 (shown in FIG. 2 and described herein).

In an operation 304, process 300 may include analyzing the metadata associated with the image. In some implementations, operation 304 may be performed by one or more processor components the same as or similar to metadata analysis component 214 (shown in FIG. 2 and described herein). In an operation 307, process 300 may include performing a statistical analysis of values from the metadata. For example, recapture detection application 210 may be configured to verify that the metadata associated with an image matches historical data sets for similar image capture devices. For example, operation 307 may include comparing focal lengths within the image with focal lengths of images determined to be POP, which are typically shorter than focal lengths of original images. In an operation 308, a score for the image may be generated based on the analysis of the metadata associated with the image. In some implementations, analyzing the metadata associated with the image may include blacklisting the image if the metadata indicates that the image has likely been manipulated or is a POP or VOV. For example, in an operation 309, process 300 may include comparing the metadata associated with the image against "fingerprints" of known manipulative software (or information within the metadata indicating that the image was derived from or has been manipulated by known manipulative software). In an operation 310, process 300 may include flagging the image if the metadata indicates the image was derived from or has been manipulated by known manipulative software. In some implementations, operations 307-310 may be performed by one or more processor components the same as or similar to metadata analysis component 214 (shown in FIG. 2 and described herein).

In an operation 311, process 300 may include inputting the score generated and output by the machine learning model based on the extracted features (from operation 306) and/or the score generated based on the analysis of the metadata associated with the image (from operation 308) into an image meta model. In an operation 312, process 300 may include calculating (and outputting) a predicted probability that the image is a recapture of an original image. In some implementations, operations 311 and 312 may be performed by one or more processor components the same as or similar to recapture model component 216 (shown in FIG. 2 and described herein).

In various implementations, authentication server 120 may be configured to receive an image and determine that the image comprises a video. As described herein, recapture detection application 210 may be configured to determine a likelihood that an image captured via an image authentication application and received by authentication server 120 via user device 110 comprises a recapture of an original image based on the visual content and/or metadata associated with the image (i.e., operation 315) and/or sensor data included within the metadata associated with the image (i.e., operation 316).

In an operation 315, process 300 may include analyzing the visual content and/or metadata associated with the image. For example, analyzing the visual content may include analyzing visual content included within still images of an image (i.e., a video) to extract features that are likely to expose the signs of a recapture and/or analyzing the metadata associated with the image by performing a statistical analysis of values from the metadata and comparing the values to historical data sets for similar image capture devices. In other words, responsive to receipt of an image comprising a video, process 300 may include performing the processing steps described with respect to operations 303-310 herein for the video. As such, a POP probability score may be generated for each image within a video as described with respect to operation 312 above.

In some implementations, analyzing the visual content and/or metadata associated with the image may include performing simultaneous localization and mapping on the image. In an operation 317, process 300 may include performing simultaneous localization and mapping (SLAM) on the image. SLAM comprises a process that interpolates an image capture device's location in three-dimensional space while simultaneously mapping the environment in three dimensions. In an operation 318, process 300 may include generating a depth map. In an operation 319, process 300 may include extracting features from the depth map that are likely to expose the signs of a rebroadcast. In an operation 320, process 300 may include estimating the trajectory of the image capture device used to capture the image in space based on the relative movement of points in successive frames determined based on SLAM.

As referenced above, in an operation 316, process 300 may include analyzing sensor data included within the metadata associated with the image. In an operation 321, process 300 may include estimating a trajectory of the image capture device based on sensor data included within the metadata associated with the image (i.e., the sensor measurements generated by the one or more sensors associated with the image capture device). The trajectory of the image capture device determined based on the sensor data may indicate a path in three-dimensional space estimated from the sensor data that describes how the image capture device moved while the image was captured. In an operation 322, process 300 may include flagging the image if the trajectory estimated based on the sensor data indicates that the image has been manipulated.

As described above, process 300 may include two independent device trajectory estimates—one estimated based on SLAM (i.e., in operation 320) and one estimated based on sensor data derived from one or more sensors associated with the image capture device (i.e., in operation 321). In an operation 323, process 300 may include measuring the similarity between the device trajectory estimated based on SLAM and the device trajectory estimated based on sensor data included within the metadata associated with the image. The similarity of the two trajectories may be used to determine if the visual information received by the image capture device is a camera original scene. In an operation 324, a score for the device trajectory based on the comparison may be generated.

In an operation 325, process 300 may include inputting the score generated based on the analysis of the metadata associated with the image (i.e., from operation 315), the features extracted from the depth map that are likely to expose the signs of a rebroadcast (i.e., from operation 319), and/or the score for the device trajectory generated based on the comparison of the two independent device trajectory estimates (i.e., from operation 324) into a video meta model. The video meta model may comprise a proprietary model configured to consume a video's depth features, image capture device trajectory estimate similarity, and sequence of POP probability scores, and return the probability that the video is a recapture (i.e., a VOV). In an operation 326, process 300 may include calculating (and outputting) a predicted probability that the image is a recapture of an original image.

The various processing operations and/or data flows depicted in FIGS. 3A, 3B, and 3C (and in the other drawing figures) are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

For purposes of explanation, numerous specific details are set forth in order to provide a thorough understanding of the description. It will be appreciated by those having skill in the art that the implementations described herein may be practiced without these specific details or with an equivalent arrangement. Accordingly, it is to be understood that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer readable storage medium may include read only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

The various instructions described herein are exemplary only. Other configurations and numbers of instructions may be used, so long as the processor(s) are programmed to perform the functions described herein. The description of the functionality provided by the different instructions described herein is for illustrative purposes, and is not intended to be limiting, as any of instructions may provide more or less functionality than is described. For example, one or more of the instructions may be eliminated, and some or all of its functionality may be provided by other ones of the instructions. As another example, processor(s) 202 may be programmed by one or more additional instructions that may perform some or all of the functionality attributed herein to one of the computer-readable instructions.

Although processor(s) 202 are illustrated in FIG. 1 as a single component, this is for illustrative purposes only. In some implementations, processor(s) 202 may comprise multiple processing units. These processing units may be physically located within the same device, or processor(s) 202 may represent processing functionality of multiple devices operating in coordination. In some implementations, one or more processors 202 may be implemented by a cloud of computing platforms operating together as one or more processors 202. Processor(s) 202 be configured to execute one or more components by software; hardware; firmware; some combination of software, hardware, and/or firmware; and/or other mechanisms for configuring processing capabilities on processor(s) 202.

As used herein, the term "component" may refer to any component or set of components that perform the functionality attributed to the component. This may include one or more physical processors during execution of processor readable instructions, the processor readable instructions, circuitry, hardware, storage media, or any other components.

Furthermore, it should be appreciated that although the various instructions are illustrated in FIG. 1 as being co-located within a single processing unit, in implementations in which processor(s) 202 include multiple processing units, one or more instructions may be executed remotely from the other instructions.

The various instructions described herein may be stored in a storage device, which may comprise random access memory (RAM), read only memory (ROM), and/or other memory. For example, electronic storage device(s) 204 may comprise any tangible computer readable storage medium, including random access memory, read only memory, magnetic disk storage media, optical storage media, flash memory devices, and/or other memory configured to computer-program instructions. In various implementations, electronic storage device(s) 204 may be configured to store the computer program instructions (e.g., the aforementioned instructions) to be executed by the processors as well as data that may be manipulated by the processors.

One or more databases may be stored in one or more storage devices of system 100 (e.g., electronic storage device(s) 204). The databases described herein may be, include, or interface to, for example, an Oracle™ relational database sold commercially by Oracle Corporation. Other databases, such as Informix™, DB2 (Database 2) or other data storage, including file-based, or query formats, platforms, or resources such as OLAP (On Line Analytical Processing), SQL (Structured Query Language), a SAN (storage area network), Microsoft Access™ or others may also be used, incorporated, or accessed. The database may comprise one or more such databases that reside in one or more physical devices and in one or more physical locations. The database may store a plurality of types of data and/or files and associated data or file descriptions, administrative information, or any other data.

The various components illustrated in FIG. 1 may be coupled to at least one other component via a network 102, which may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. In FIG. 1, as well as in other drawing Figures, different numbers of entities than those depicted may be used. Furthermore, according to various implementations, the components described herein may be implemented in hardware and/or software that configure hardware.

In some instances, well-known structures and devices are shown in block diagram form in order to avoid unnecessarily obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

Reference in this specification to "one implementation", "an implementation", "some implementations", "various implementations", "certain implementations", "other implementations", "one series of implementations", or the like means that a particular feature, design, structure, or characteristic described in connection with the implementation is included in at least one implementation of the disclosure. The appearances of, for example, the phrase "in one implementation" or "in an implementation" in various places in the specification are not necessarily all referring to the same implementation, nor are separate or alternative implementations mutually exclusive of other implementations. Moreover, whether or not there is express reference to an "implementation" or the like, various features are described, which may be variously combined and included in some implementations, but also variously omitted in other implementations. Similarly, various features are described that may be preferences or requirements for some implementations, but not other implementations.

The language used herein has been principally selected for readability and instructional purposes, and it may not have been selected to delineate or circumscribe the inventive subject matter. Other implementations, uses, and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A system for detecting image recapture, the system comprising:
　a hardware processor;
　an image capture sensor;
　one or more other sensors; and
　a system encoded with instructions executable by the hardware processor to perform operations comprising:
　　extracting one or more features from an image captured by the image capture sensor;
　　generating a first score based on the extracted one or more features;
　　obtaining metadata generated by the one or more other sensors;
　　generating a second score based on performing a first analysis that comprises comparing the metadata with fingerprints of known image manipulation software; and
　　generating a probability that the image is a recapture of an original image based on the first score and the second score.

2. The system of claim 1, wherein a portion of the instructions comprises a recapture detection application, the recapture detection application comprising:
　a content analysis component configured to perform a second analysis of the extracted one or more features; and
　a metadata analysis component configured to perform the first analysis;
　wherein the operations further comprise:
　　generating the first score based on the second analysis.

3. The system of claim 2, wherein performing the second analysis comprises identifying one or more recapture characteristics.

4. The system of claim 2, wherein performing the second analysis comprises performing a discrete cosine transform of the image.

5. The system of claim 2, wherein performing the second analysis comprises applying the extracted one or more features as input to a trained machine learning model, wherein the trained machine learning model outputs the first score based on the extracted one or more features.

6. The system of claim 2, wherein performing the second analysis comprises at least one of:
  detecting that a surface is flat or two-dimensional;
  detecting pixel color profiles and edges;
  detecting muted color distributions;
  detecting aliasing; or
  detecting Moiré pattern.

7. The system of claim 2, wherein performing the first analysis comprises identifying one or more potential indicators of recapture.

8. The system of claim 2, wherein performing the first analysis comprises at least one of:
  determining whether a focal distance used by an image capture device to capture the image aligns with visual content of the image;
  determining whether intrinsic and distortion coefficients of the image capture device accurately undistort the image; or
  determining whether position and orientation sensors of the image capture device imply that the device was pointing in a direction consistent with visual content of the image.

9. A method for detecting image recapture, the method comprising:
  extracting one or more features from an image captured by an image capture sensor;
  generating a first score based on the extracted one or more features;
  obtaining metadata generated by one or more other sensors;
  generating a second score based on performing a first analysis that comprises comparing the metadata with fingerprints of known image manipulation software; and
  generating a probability that the image is a recapture of an original image based on the first score and the second score.

10. The method of claim 9, further comprising:
  performing a second analysis of the extracted one or more features; and
  generating the first score based on the second analysis.

11. The method of claim 10, wherein performing the second analysis comprises identifying one or more recapture characteristics.

12. The method of claim 10, wherein performing the second analysis comprises performing a discrete cosine transform of the image.

13. The method of claim 10, wherein performing the second analysis comprises applying the extracted one or more features as input to a trained machine learning model, wherein the trained machine learning model outputs the first score based on the extracted one or more features.

14. The method of claim 10, wherein performing the second analysis comprises at least one of:
  detecting that a surface is flat or two-dimensional;
  detecting pixel color profiles and edges;
  detecting muted color distributions;
  detecting aliasing; or
  detecting Moiré pattern.

15. The method of claim 10, wherein performing the first analysis comprises identifying one or more potential indicators of recapture.

16. The method of claim 10, wherein performing the first analysis comprises at least one of:
  determining whether a focal distance used by an image capture device to capture the image aligns with visual content of the image;
  determining whether intrinsic and distortion coefficients of the image capture device accurately undistort the image; or
  determining whether position and orientation sensors of the image capture device imply that the device was pointing in a direction consistent with visual content of the image.

17. A system for detecting image recapture, the system comprising:
  a hardware processor; and
  a system encoded with instructions executable by the hardware processor to perform operations comprising:
    extracting one or more features from an image;
    generating a first score based on the extracted one or more features;
    obtaining metadata of the image;
    generating a second score based on the metadata of the image; and
    generating a probability that the image is a recapture of an original image based on the first score and the second score;
  wherein a portion of the instructions comprises a recapture detection application, the recapture detection application comprising:
    a content analysis component configured to perform a first analysis of the extracted one or more features; and
    a metadata analysis component configured to perform a second analysis of the metadata, wherein performing the second analysis comprises comparing the metadata with fingerprints of known image manipulation software; and
  wherein the operations further comprise:
    generating the first score based on the first analysis, and
    generating the second score based on the second analysis.

* * * * *